US012659723B2

(12) United States Patent
Elshafie et al.

(10) Patent No.: US 12,659,723 B2
(45) Date of Patent: Jun. 16, 2026

(54) DATA-AWARE PRECODING FOR BASE STATIONS AND USER EQUIPMENT (UEs)

(71) Applicant: QUALCOMM Incorporated, San Diego, CA (US)

(72) Inventors: Ahmed Elshafie, San Diego, CA (US); Sony Akkarakaran, Poway, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 18/549,562

(22) PCT Filed: May 8, 2021

(86) PCT No.: PCT/CN2021/092300
§ 371 (c)(1),
(2) Date: Sep. 7, 2023

(87) PCT Pub. No.: WO2022/236456
PCT Pub. Date: Nov. 17, 2022

(65) Prior Publication Data
US 2024/0155330 A1 May 9, 2024

(51) Int. Cl.
*H04W 8/22* (2009.01)
*H04L 5/00* (2006.01)
*H04W 72/231* (2023.01)

(52) U.S. Cl.
CPC ............. *H04W 8/22* (2013.01); *H04L 5/0051* (2013.01); *H04W 72/231* (2023.01)

(58) Field of Classification Search
CPC .... H04W 8/22; H04W 72/231; H04L 5/0051; H04L 25/03343; H04B 7/0456
See application file for complete search history.

(56) References Cited

U.S. PATENT DOCUMENTS

2008/0233902 A1* 9/2008 Pan ...................... H04B 7/0654
375/296
2010/0303034 A1* 12/2010 Chen ................ H04L 25/03343
370/329
(Continued)

FOREIGN PATENT DOCUMENTS

WO 2013135085 A1 9/2013
WO 2017050930 A1 3/2017
WO 2020108367 A1 6/2020

OTHER PUBLICATIONS

International Search Report and Written Opinion—PCT/CN2021/092300—ISA/EPO—Oct. 22, 2021.
(Continued)

*Primary Examiner* — Ayaz R Sheikh
*Assistant Examiner* — Tarell A Hampton
(74) *Attorney, Agent, or Firm* — Seyfarth Shaw LLP

(57) ABSTRACT

A method for wireless communication performed at a user equipment (UE) includes receiving, from a base station, an indication that the base station supports data-aware precoding. The method also includes transmitting, to the base station based on the base station supporting data-aware precoding, an indication that the UE supports the data-aware precoding and an indication of data-aware precoding capabilities of the UE. The method also includes receiving, from the base station, a current precoding mode indicator identifying a current precoding mode for precoding one or more resource elements of one or more subcarriers at the base station. The method further includes receiving, from the base station, a data transmission on a data channel, both the data transmission and the data channel precoded based on the current precoding mode. The method still further includes decoding the data transmission and the data channel based on the current precoding mode.

18 Claims, 8 Drawing Sheets

(56)    References Cited

U.S. PATENT DOCUMENTS

| | | | |
|---|---|---|---|
| 2012/0082256 A1* | 4/2012 | Gaur | H04B 7/0456 |
| | | | 375/285 |
| 2012/0281554 A1* | 11/2012 | Gao | H04L 5/0053 |
| | | | 370/252 |
| 2014/0314041 A1* | 10/2014 | Kim | H04L 5/0048 |
| | | | 370/329 |
| 2017/0288710 A1* | 10/2017 | Delfeld | H04L 5/0048 |
| 2017/0288751 A1* | 10/2017 | Faxér | H04B 7/0465 |
| 2017/0288759 A1* | 10/2017 | Namgoong | H04W 52/0258 |
| 2018/0337714 A1* | 11/2018 | Kuchi | H04L 27/2636 |
| 2019/0140729 A1* | 5/2019 | Zhang | H04B 7/0478 |
| 2019/0319692 A1* | 10/2019 | Noh | H04L 5/0048 |
| 2020/0275416 A1* | 8/2020 | Haghighat | H04L 25/0204 |
| 2020/0304359 A1* | 9/2020 | Li | H04L 27/2678 |
| 2021/0345253 A1* | 11/2021 | Matsumura | H04B 7/0628 |
| 2022/0014411 A1* | 1/2022 | Baligh | H04L 27/3488 |
| 2022/0286174 A1* | 9/2022 | Okamura | H04B 7/0456 |
| 2023/0163816 A1* | 5/2023 | Zhao | H04L 25/03898 |
| | | | 375/267 |
| 2023/0291613 A1* | 9/2023 | Gao | H04L 5/0051 |
| 2023/0361820 A1* | 11/2023 | Alodeh | H04B 7/0456 |

OTHER PUBLICATIONS

Li, A., et al., "A Tutorial on Interference Exploitation via Symbol-Level Precoding: Overview, State-of-the-Art and Future Directions", IEEE Communications Surveys Tutorials, IEEE, USA, vol. 22, No. 2, Mar. 13, 2020 (Mar. 13, 2020), XP011790730, pp. 796-839, DOI: 10.1109/COMST.2020.2980570 [retrieved on May 27, 2020] Sections I-C, II and III, Figures 4-5, Section III equation (46).

* cited by examiner

400

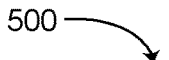
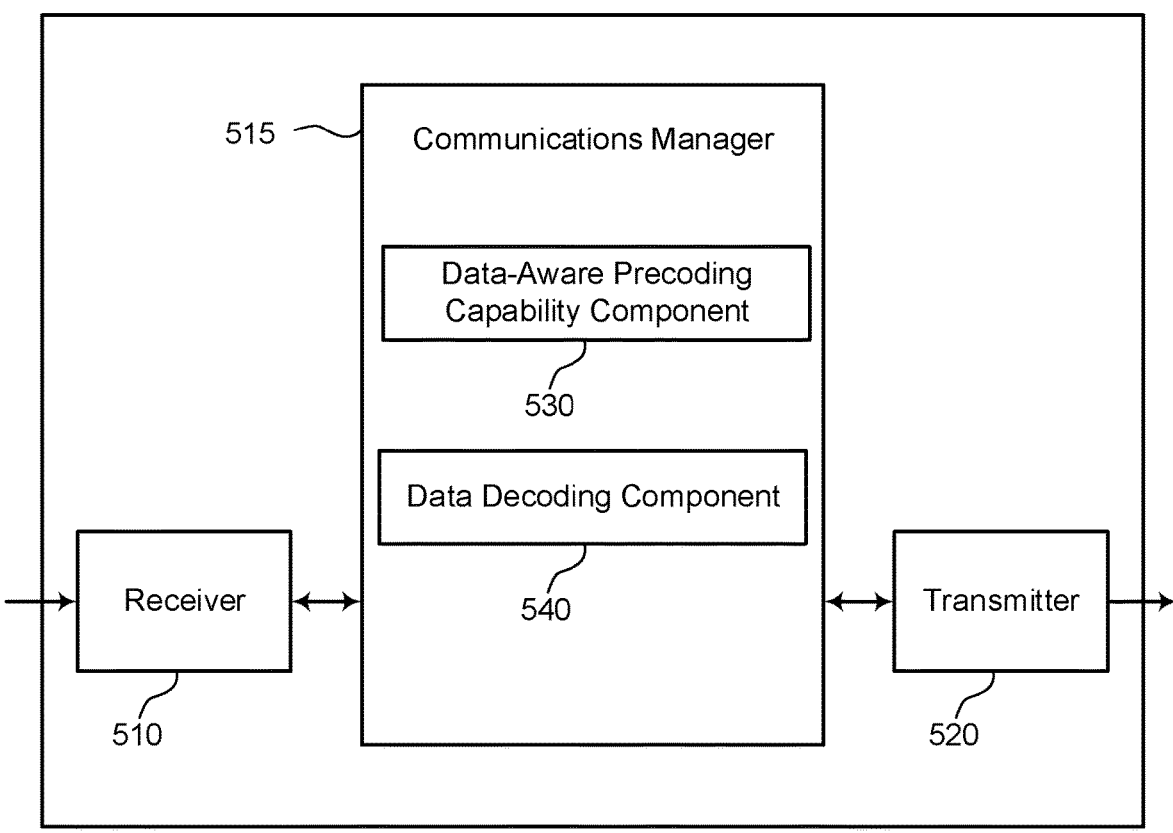
*FIG. 5*

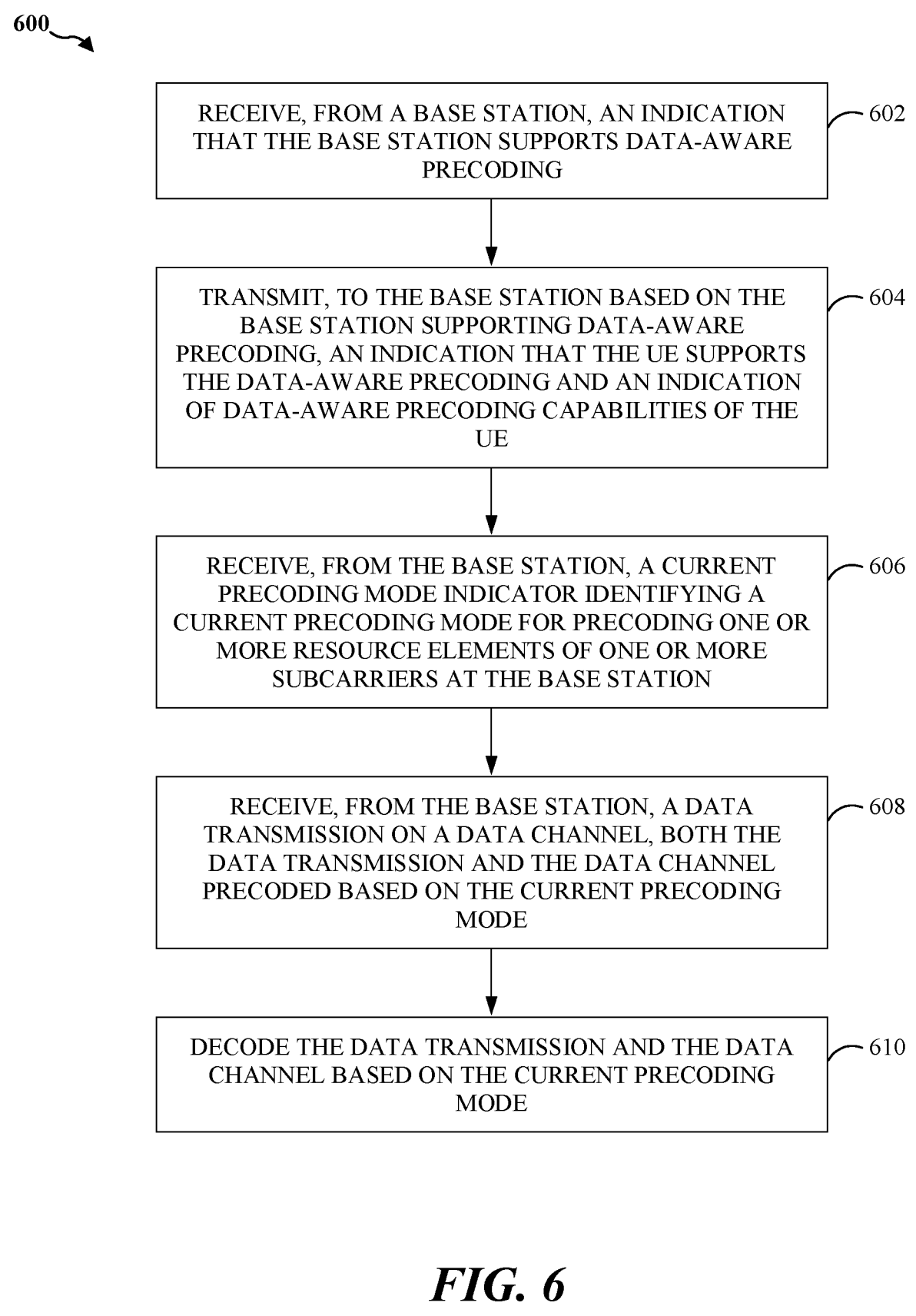

600

RECEIVE, FROM A BASE STATION, AN INDICATION THAT THE BASE STATION SUPPORTS DATA-AWARE PRECODING — 602

TRANSMIT, TO THE BASE STATION BASED ON THE BASE STATION SUPPORTING DATA-AWARE PRECODING, AN INDICATION THAT THE UE SUPPORTS THE DATA-AWARE PRECODING AND AN INDICATION OF DATA-AWARE PRECODING CAPABILITIES OF THE UE — 604

RECEIVE, FROM THE BASE STATION, A CURRENT PRECODING MODE INDICATOR IDENTIFYING A CURRENT PRECODING MODE FOR PRECODING ONE OR MORE RESOURCE ELEMENTS OF ONE OR MORE SUBCARRIERS AT THE BASE STATION — 606

RECEIVE, FROM THE BASE STATION, A DATA TRANSMISSION ON A DATA CHANNEL, BOTH THE DATA TRANSMISSION AND THE DATA CHANNEL PRECODED BASED ON THE CURRENT PRECODING MODE — 608

DECODE THE DATA TRANSMISSION AND THE DATA CHANNEL BASED ON THE CURRENT PRECODING MODE — 610

*FIG. 6*

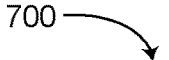
700
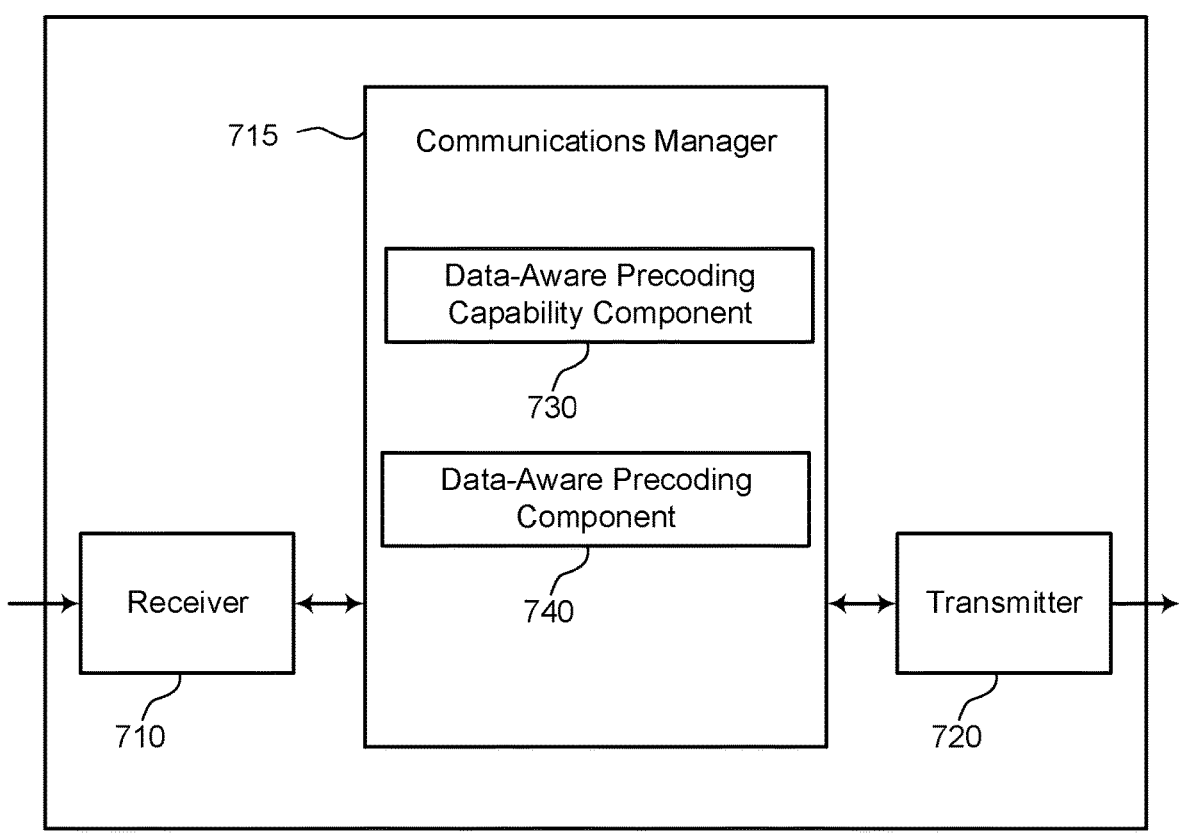
715 — Communications Manager
Data-Aware Precoding
Capability Component
730
Data-Aware Precoding
Component
740
Receiver
710
Transmitter
720
*FIG. 7*

800

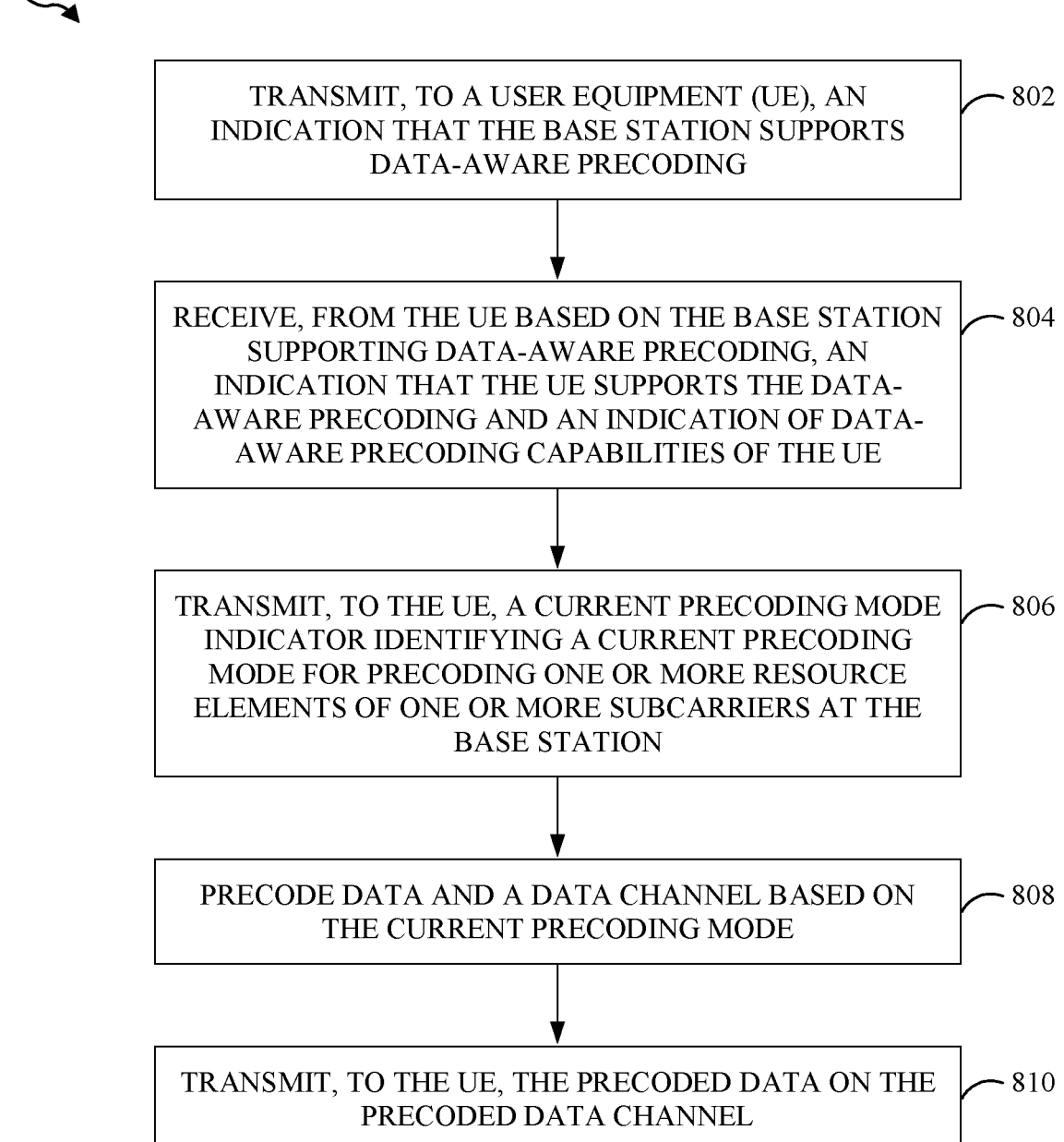

TRANSMIT, TO A USER EQUIPMENT (UE), AN INDICATION THAT THE BASE STATION SUPPORTS DATA-AWARE PRECODING — 802

RECEIVE, FROM THE UE BASED ON THE BASE STATION SUPPORTING DATA-AWARE PRECODING, AN INDICATION THAT THE UE SUPPORTS THE DATA-AWARE PRECODING AND AN INDICATION OF DATA-AWARE PRECODING CAPABILITIES OF THE UE — 804

TRANSMIT, TO THE UE, A CURRENT PRECODING MODE INDICATOR IDENTIFYING A CURRENT PRECODING MODE FOR PRECODING ONE OR MORE RESOURCE ELEMENTS OF ONE OR MORE SUBCARRIERS AT THE BASE STATION — 806

PRECODE DATA AND A DATA CHANNEL BASED ON THE CURRENT PRECODING MODE — 808

TRANSMIT, TO THE UE, THE PRECODED DATA ON THE PRECODED DATA CHANNEL — 810

*FIG. 8*

DATA-AWARE PRECODING FOR BASE STATIONS AND USER EQUIPMENT (UEs)

FIELD OF THE DISCLOSURE

The present disclosure relates generally to wireless communications, and specifically, to implementing data-aware precoding at base stations and user equipment (UEs).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In some wireless communication systems, a transmitter, such as a base station, may precode downlink signals to enable simultaneous data transmissions to multiple receivers, such as user equipment (UEs), in the wireless communication system. In some such examples, the transmitter may adjust one or both of an amplitude or phase of a downlink signal during the precoding process to improve signal quality. In some conventional systems, the precoding may be a function of a channel state. In such systems, the transmitter may determine the channel state based on channel state reports, such as a channel state information (CSI) report, received from one or more receivers. In such examples, the precoding may adjust one or both of the amplitude or the phase of the downlink signal to reduce inter-user interference. Some conventional precoding systems may consider interference as a limiting factor in a wireless communication system. In some examples, the interference may be referred to as destructive interference. Such conventional precoding systems may attempt to mitigate or reduce the destructive interference. In contrast, some systems may constructively use the interference to improve signal strength or quality. Such interference may be an example of constructive interference. As an example, constructive interference may be an example of interference that pushes a signal away from corresponding decision boundaries of a modulated-symbol constellation, thereby improving signal power. In such systems, the precoding may be a function of both a channel state and transmitted data. This type of precoding may be an example of symbol-level precoding or data-aware precoding.

SUMMARY

In one aspect of the present disclosure, a method for wireless communication by a user equipment (UE) includes receiving, from a base station, an indication that the base station supports data-aware precoding. The method further includes transmitting, to the base station based on the base station supporting data-aware precoding, an indication that the UE supports the data-aware precoding and an indication of data-aware precoding capabilities of the UE. The method also includes receiving, from the base station, a current precoding mode indicator identifying a current precoding mode for precoding one or more resource elements of one or more subcarriers at the base station. The method further includes receiving, from the base station, a data transmission on a data channel, both the data transmission and the data channel precoded based on the current precoding mode. The method still further includes decoding the data transmission and the data channel based on the current precoding mode.

Another aspect of the present disclosure is directed to an apparatus for wireless communication at a UE. The apparatus includes means for receiving, from a base station, an indication that the base station supports data-aware precoding. The apparatus further includes means for transmitting, to the base station based on the base station supporting data-aware precoding, an indication that the UE supports the data-aware precoding and an indication of data-aware precoding capabilities of the UE. The apparatus also includes means for receiving, from the base station, a current precoding mode indicator identifying a current precoding mode for precoding one or more resource elements of one or more subcarriers at the base station. The apparatus further includes means for receiving, from the base station, a data transmission on a data channel, both the data transmission and the data channel precoded based on the current precoding mode. The apparatus still further includes means for decoding the data transmission and the data channel based on the current precoding mode.

In another aspect of the present disclosure, a non-transitory computer-readable medium with non-transitory program code recorded thereon for wireless communication at a UE is disclosed. The program code is executed by a processor and includes program code to receive, from a base station, an indication that indicating the base station supports data-aware precoding. The program code further includes program code to transmit, to the base station based on the base station supporting data-aware precoding, an indication that the UE supports the data-aware precoding and an indication of data-aware precoding capabilities of the UE. The program code also includes program code to receive, from the base station, a current precoding mode indicator identifying a current precoding mode for precoding one or more resource elements of one or more subcarriers at the base station. The program code further includes program code to receive, from the base station, a data transmission on a data channel, both the data transmission and the data channel precoded based on the current precoding mode. The program code still further includes program code to decode the data transmission and the data channel based on the current precoding mode.

Another aspect of the present disclosure is directed to an apparatus for wireless communication at a UE, the apparatus includes a processor, and a memory communicatively coupled with the processor and storing instructions that, when executed by the processor, cause the apparatus to receive, from a base station, an indication that the base station supports data-aware precoding. Execution of the instructions also cause the apparatus to transmit, to the base station based on the base station supporting data-aware precoding, an indication that the UE supports the data-aware precoding and an indication of data-aware precoding capabilities of the UE. Execution of the instructions still further cause the apparatus to receive, from the base station, a current precoding mode indicator identifying a current pre-coding mode for precoding one or more resource elements of one or more subcarriers at the base station. Execution of the instructions still yet further cause the apparatus to receive, from the base station, a data transmission on a data channel, both the data transmission and the data channel precoded based on the current precoding mode. Execution of the instructions also cause the apparatus to decode the data transmission and the data channel based on the current precoding mode.

In one aspect of the present disclosure, a method for wireless communication at a base station includes transmitting, to a UE, an indication that the base station supports data-aware precoding. The method further includes receiving, from the UE based on the base station supporting data-aware precoding, an indication that the UE supports the data-aware precoding and an indication of data-aware pre-coding capabilities of the UE. The method also includes transmitting, to the UE, a current precoding mode indicator identifying a current precoding mode for precoding one or more resource elements of one or more subcarriers at the base station. The method further includes precoding data and a data channel based on the current precoding mode. The method still further includes transmitting, to the UE, the precoded data on the precoded data channel.

Another aspect of the present disclosure is directed to an apparatus for wireless communication at a base station. The apparatus includes means for transmitting, to a UE, an indication that the base station supports data-aware precod-ing. The apparatus further includes means for receiving, from the UE based on the base station supporting data-aware precoding, an indication that the UE supports the data-aware precoding and an indication of data-aware precoding capa-bilities of the UE. The apparatus also includes means for transmitting, to the UE, a current precoding mode indicator identifying a current precoding mode for precoding one or more resource elements of one or more subcarriers at the base station. The apparatus further includes means for precoding data and a data channel based on the current precoding mode. The apparatus still further includes means for transmitting, to the UE, the precoded data on the pre-coded data channel.

In another aspect of the present disclosure, a non-transi-tory computer-readable medium with non-transitory pro-gram code recorded thereon for wireless communication at a base station is disclosed. The program code is executed by a processor and includes program code to transmit, to a UE, an indication that the base station supports data-aware precoding. The program code further includes program code to receive, from the UE based on the base station supporting data-aware precoding, an indication that the UE supports the data-aware precoding and an indication of data-aware pre-coding capabilities of the UE. The program code also includes program code to transmit, to the UE, a current precoding mode indicator identifying a current precoding mode for precoding one or more resource elements of one or more subcarriers at the base station. The program code further includes program code to precode data and a data channel based on the current precoding mode. The program code still further includes program code to transmit, to the UE, the precoded data on the precoded data channel.

Another aspect of the present disclosure is directed to an apparatus for wireless communication at a UE, the apparatus includes a processor, and a memory communicatively coupled with the processor and storing instructions that, when executed by the processor, cause the apparatus to transmit, to a UE, an indication that the base station supports data-aware precoding. Execution of the instructions also cause the apparatus to receive, from the UE based on the base station supporting data-aware precoding, an indication that the UE supports the data-aware precoding and an indication of data-aware precoding capabilities of the UE. Execution of the instructions still further cause the apparatus to transmit, to the UE, a current precoding mode indicator identifying a current precoding mode for precoding one or more resource elements of one or more subcarriers at the base station. Execution of the instructions also cause the apparatus to precode data and a data channel based on the current precoding mode. Execution of the instructions fur-ther cause the apparatus to transmit, to the UE, the precoded data on the precoded data channel.

Aspects generally include a method, apparatus, system, computer program product, non-transitory computer-read-able medium, user equipment, base station, wireless com-munications device, and processing system as substantially described with reference to and as illustrated by the accom-panying drawings and specification.

The foregoing has outlined rather broadly the features and technical advantages of examples according to the disclo-sure in order that the detailed description that follows may be better understood. Additional features and advantages will be described. The conception and specific examples disclosed may be readily utilized as a basis for modifying or designing other structures for carrying out the same pur-poses of the present disclosure. Such equivalent construc-tions do not depart from the scope of the appended claims. Characteristics of the concepts disclosed, both their organi-zation and method of operation, together with associated advantages will be better understood from the following description when considered in connection with the accom-panying figures. Each of the figures is provided for the purposes of illustration and description, and not as a defi-nition of the limits of the claims.

BRIEF DESCRIPTION OF THE DRAWINGS

So that features of the present disclosure can be under-stood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 5 is a block diagram of a wireless communication device that supports data-aware precoding, in accordance with various aspects of the present disclosure.

FIG. 6 is a flow diagram illustrating an example process performed at a UE for data-aware precoding, in accordance with various aspects of the present disclosure.

FIG. 7 is a block diagram of a wireless communication device that supports data-aware precoding, in accordance with various aspects of the present disclosure.

FIG. 8 is a flow diagram illustrating an example process performed at a base station for data-aware precoding, in accordance with various aspects of the present disclosure.

DETAILED DESCRIPTION

Figure 1:
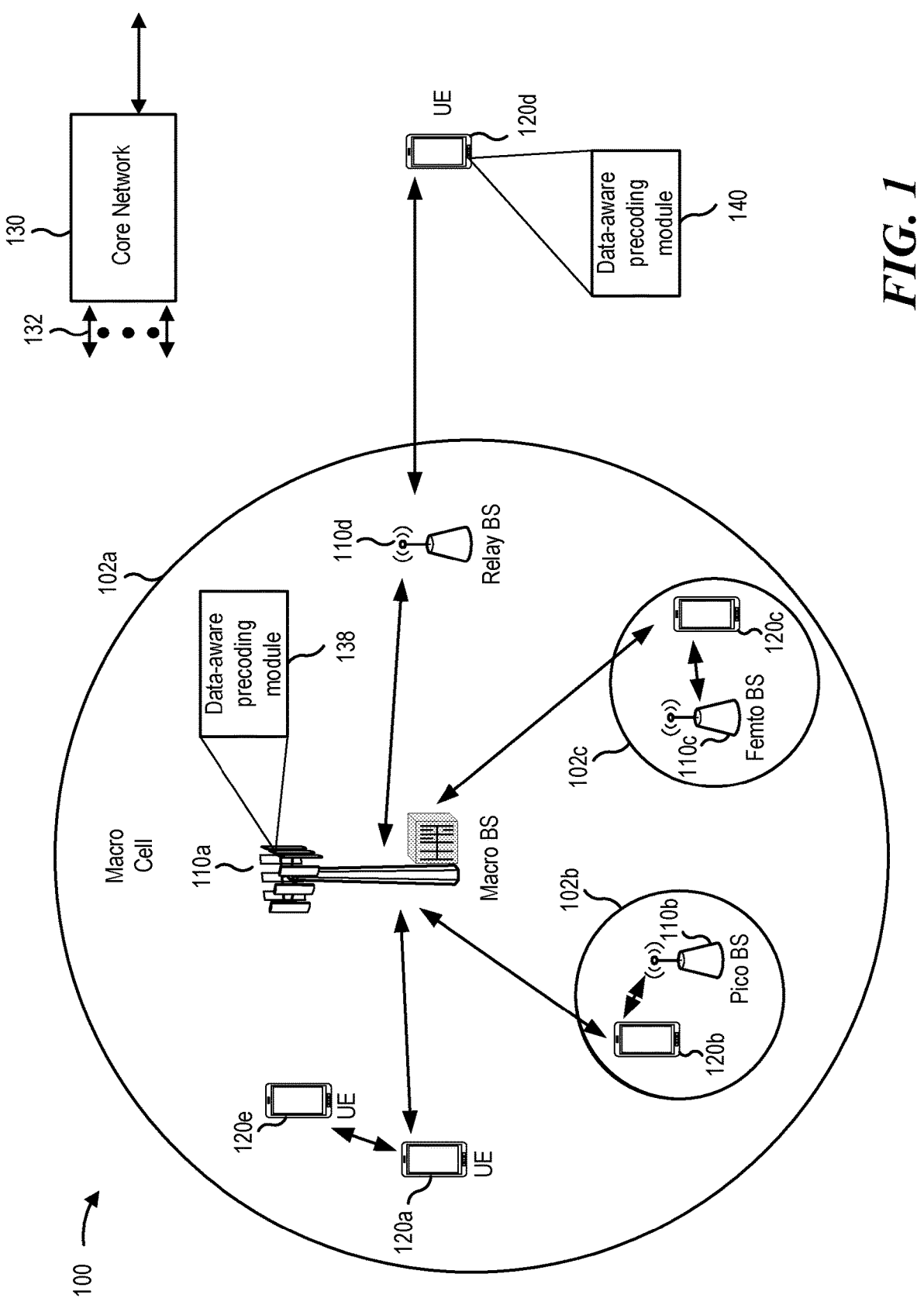
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In some wireless communication systems, a transmitter may precode downlink signals to enable simultaneous data transmissions to multiple receivers in the wireless communication system. In some such examples, the transmitter may adjust one or both of an amplitude or phase of a downlink signal during the precoding process to improve signal quality. In some conventional systems, the precoding may be a function of a channel state. In such systems, the transmitter may determine the channel state based on channel state report, such as a channel state information (CSI) report, received from one or more receivers, such as user equipment (UEs). In such examples, the precoding matrix may be determined based on the CSI and a same precoding matrix may be applied across a block of symbols. The precoding matrix may be updated based on a change in the channel state. Such conventional precoding systems may identify interference as destructive interference that should be reduced or mitigated.

In contrast, some systems may manipulate interference to improve signal strength or quality. As an example, some systems may control both a power and a direction of interfering signals or transmitted signals on a received complex plane on a symbol level. In such an example, the interference may be used to improve received signal power. Interference used to improve received signal power may be an example of constructive interference. As an example, constructive interference may push a signal away from corresponding decision boundaries of a modulated-symbol constellation, thereby improving received signal power. In such systems, the precoding may be a function of both a channel state and transmitted data. This type of precoding may be an example of symbol-level precoding or data-aware precoding. For ease of explanation, the present application refers to such precoding as data-aware precoding.

Aspects of the present disclosure generally relate to symbol-level precoding. Various aspects more specifically relate to techniques and processes for transmitting and receiving data-aware precoded signals. Particular aspects relate to a UE receiving, from a base station, a first message indicating the base station supports data-aware precoding. In some implementations, the UE transmits, to the base station, based on the received first message, a second message indicating the UE supports the data-aware precoding, and a third message indicating the UE's data-aware precoding capabilities. Examples of the data-aware precoding capabilities include a number of resource elements supported for group precoding and an indication of whether the UE supports wideband precoding. In some implementations, the UE may receive, from the base station, a current precoding mode indicator identifying a current precoding mode for precoding one or more resource elements of one or more subcarriers. In some examples, the current precoding mode precodes a single resource element of a single carrier. In some other examples, the current precoding mode precodes multiple resource elements of multiple subcarriers. In some examples, the current precoding mode may be a separate precoding mode or a joint precoding mode. In some such examples, the separate precoding mode may use a channel precoding function for precoding a data channel and a data precoding function for precoding data transmitted on the data channel. In other such examples, the joint precoding mode may use a single precoding function for precoding both the data channel and the data. In some implementations, the UE receives, from the base station, a data transmission on the data channel. Both the data and the data channel may be precoded based on the current precoding mode.

Particular aspects of the subject matter improve downlink signal strength by applying data-aware precoding to a transmitted downlink signal. In some such aspects, the data-aware precoding may manipulate interference to increase the signal strength of the transmitted downlink signal. The increase in the signal strength may also increase a likelihood of receiving the transmitted downlink signal at the receiver, thereby improving overall performance of a wireless communication system.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a data-aware precoding module 140. For brevity, only one UE 120d is shown as including the data-aware precoding module 140. The data-aware precoding module 140 may receive, from the base station 110, a first message indicating the base station supports data-aware precoding. The data-aware precoding module 140 may further transmit, to the base station 110 based on the received first message, a second message indicating the UE 120d supports the data-aware precoding. The data-aware precoding module 140 may still further transmits, to the base station 110 based on the transmitted second message, a third message indicating data-aware precoding capabilities of the UE 120d. The data-aware precoding module 140 may also receive, from the base station 110, a current precoding mode indicator identifying a current precoding mode for precoding one or more resource elements of one or more subcarriers of the base station. The data-aware precoding module 140 may further includes receive, from the base station 110, a data transmission on a data channel, both the data transmission and the data channel precoded based on the current precoding mode. The data-aware precoding module 140 may still further decode the data transmission and the data channel based on the current precoding mode.

The base stations 110 may include a data-aware precoding module 138 for transmitting, to a UE 120, a first message indicating the base station supports data-aware precoding. The data-aware precoding module 138 may further receive, from the UE 120 based on the first message, a second message indicating the UE 120 supports the data-aware precoding. The data-aware precoding module 138 may also receive, from the UE 120 based on the transmitted second message, a third message indicating data-aware precoding capabilities of the UE 120. The data-aware precoding module 138 may also transmit, to the UE 120, a current precoding mode indicator identifying a current precoding mode for precoding one or more resource elements of one or more subcarriers of the base station. The data-aware precoding module 138 may further precode data and a data channel based on the current precoding mode. The data-aware precoding module 138 may still further transmit, to the UE 120, the precoded data on the precoded data channel.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
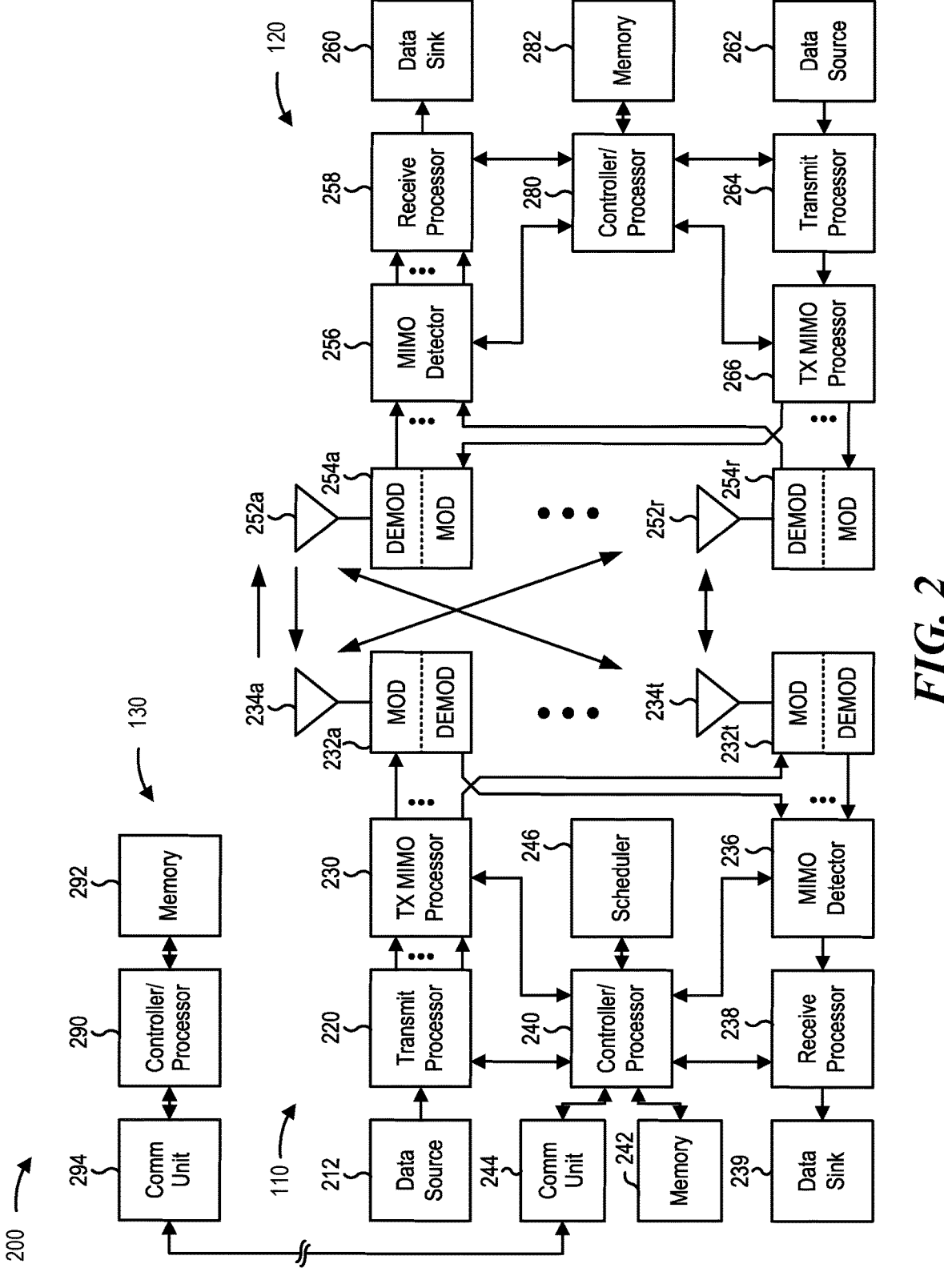
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with data-aware precoding as described in more detail elsewhere. For example, the controller/processor 240 of the base station 110, the controller/processor 280 of the UE 120, and/or any other component(s) of FIG. 2 may perform or direct operations of, for example, the process of FIGS. 6 and 8 or other processes as described. Memories 242 and 282 may store data and program codes for the base station 110 and UE 120, respectively. A scheduler 246 may schedule UEs for data transmission on the downlink and/or uplink.

As described, some wireless communication systems may constructively use interference by controlling both a power and a direction of an interfering signal or a transmitted signal on a received complex plane to improve received signal strength or quality. In such an example, the power and the direction of the interfering signal or the transmitted signal may be controlled on a symbol level to push the transmitted signal away from corresponding decision boundaries of a modulated-symbol constellation, thereby improving the received signal power. In some implementations, a precoder may constructively use interference to further improve received signal quality. In such systems, the precoder may control both a power and a direction of a data transmission, such that the interference pushes the data transmission away from corresponding decision boundaries of a modulated-symbol constellation. In some examples, the precoder may be a function of both a channel state and transmitted data. This type of precoding may be an example of symbol-level precoding or data-aware precoding. For ease of explanation, the present application refers to such precoding as data-aware precoding.

As described, data-aware precoding applies a precoding function to a data channel and data transmitted on the data channel. In some examples, the data channel and the data are input to one or more antennae of the base station. In some such examples, the precoder output $p_k$ may be determined as $p_k=f(H_k, s_k)$, where k represents a subcarrier index, $H_k$ represents a propagation channel matrix on the k-th subcarrier from the one or more base station antennas to one or more UE antennas. Additionally, s k represents a vector of modulation symbols (for example, quadrature phase shift keying (QPSK) symbols) from the paired UEs for transmission on the k-th subcarrier from the one or more base station antennas. In some examples, a mapping of the vector of modulation symbols $s_k$ to the precoder output $p^k$ may change from subcarrier to subcarrier. For ease of explanation, in some examples, $H_k$ may be referred to as a data channel, such as a physical downlink shared channel (PDSCH), and $s_k$ may be referred to as data transmitted on the data channel.

In some implementations, the data-aware precoder may specify per tone separated linear precoders. In such examples, a different precoder function may be applied for each subcarrier k (for example, resource element index). In some such examples, a joint precoder function, such as $p_k=f(H_k, s_k)$, may be linearly separated, such that $p_k=f(H_k, s_k)=p_{k1}p_{k2}=f_1(H_k)f_2(s_k)$ where $p_{ki}=f_i(H_k)$. In such examples, the joint precoding function $f(H_k, s_k)$ may be applied to both the data channel (for example, $H_k$) and the data (for example, $s_k$). In some other examples, the separated precoding function $f_1(H_k)f_2(s_k)$ may include a channel precoder function $f_1( )$ for precoding the data channel and a data precoder function $f_2( )$ for precoding the data.

In some examples, the precoded channel $f_1(H_k)$ may be signaled in a demodulation reference signal (DMRS). In some implementations, the UE may estimate the channel precoder function by decoding a DMRS. The DMRS may be a UE-specific DMRS. Additionally, the DMRS may be precoded using a same precoding function (for example, precoding matrix) applied to the downlink channel. Additionally, the precoded channel and the precoded data (for example, $f_1(H_k)f_2(s_k)$) may be signaled in a downlink data channel, such as the PDSCH. Furthermore, in such examples, the data precoder function may be explicitly indicated to the UE. In some examples, the explicit indication may be signaled in downlink control information (DCI), radio resource control (RRC) signaling, or a medium access control (MAC) control element (CE) message. In some such examples, a current precoding mode (for example, a joint precoding mode or a separate precoding mode) may also be indicated in the signal carrying the explicit indication of the data precoder function. In some implementations, the UE may decode data after determining the channel precoder function and the data decoder function. In some such implementations, the UE may use a maximum likelihood (ML) decoder to identify transmitted data on the data channel. In such implementations, the data channel may be decoded based on the channel precoder function determined based on the DMRS and the data may be decoded based on the data precoder function identified based on the explicit indication.

In some other implementations, the data-aware precoder may precode M resource elements of a resource block. The data-aware precoder specified for precoding the M resource elements may be an example of a group precoder. In some examples, M represents a number of resource elements, such as the number of resource elements in a single symbol. In some other examples, M is a product of K and a number of layers of data symbols, where K represents a number of resource elements. For example, $M=K*(\alpha$ number of data layer symbols). In such examples, the precoder may precode resource elements in one or more subcarriers of one or more symbols. The UE may indicate a number of supported data layer symbols in data-aware precoding capabilities transmitted to the base station. In such implementations, the data-aware precoder may be a joint precoder, such as, $p_k=f(H_1, H_2, H_3, \ldots, H_M, s_1, s_2, \ldots, s_M)$. In some other examples, the data-aware precoder may be a separated precoder, such as, $p_{k1}p_{k2}=f_1(H_1, H_2, \ldots, H_M)f_2(s_1, s_2, \ldots, s_M)$, where $p_k=f(H_1, H_2, H_3, \ldots, H_M, s_1, s_2, \ldots, s_M)=p_{k1}p_{k2}=f_1(H_1, H_2, \ldots, H_M)f_2(s_1, s_2, \ldots, s_M)$. Similar to the per tone separated linear precoder, a UE may determine a channel precoder for the group precoder based on the DMRS. For example, the precoded channels $f_1(H_1, H_2, \ldots, H_M)$ may be determined based on the DMRS. Additionally, precoded channels and precoded data (for example, $f_1(H_1, H_2, \ldots, H_M)f_2(s_1, s_2, \ldots, s_M)$) may be transmitted on a downlink data channel, such as the PDSCH. In such examples, the UE may determine a data decoder function based on an explicit indication. Furthermore, in some examples, the data may be decoded on the data channel estimated based on the DMRS using the data decoder function identified based on the explicit indication. In such examples, a group of resource elements may be jointly decoded.

Figures 3A, 3B:
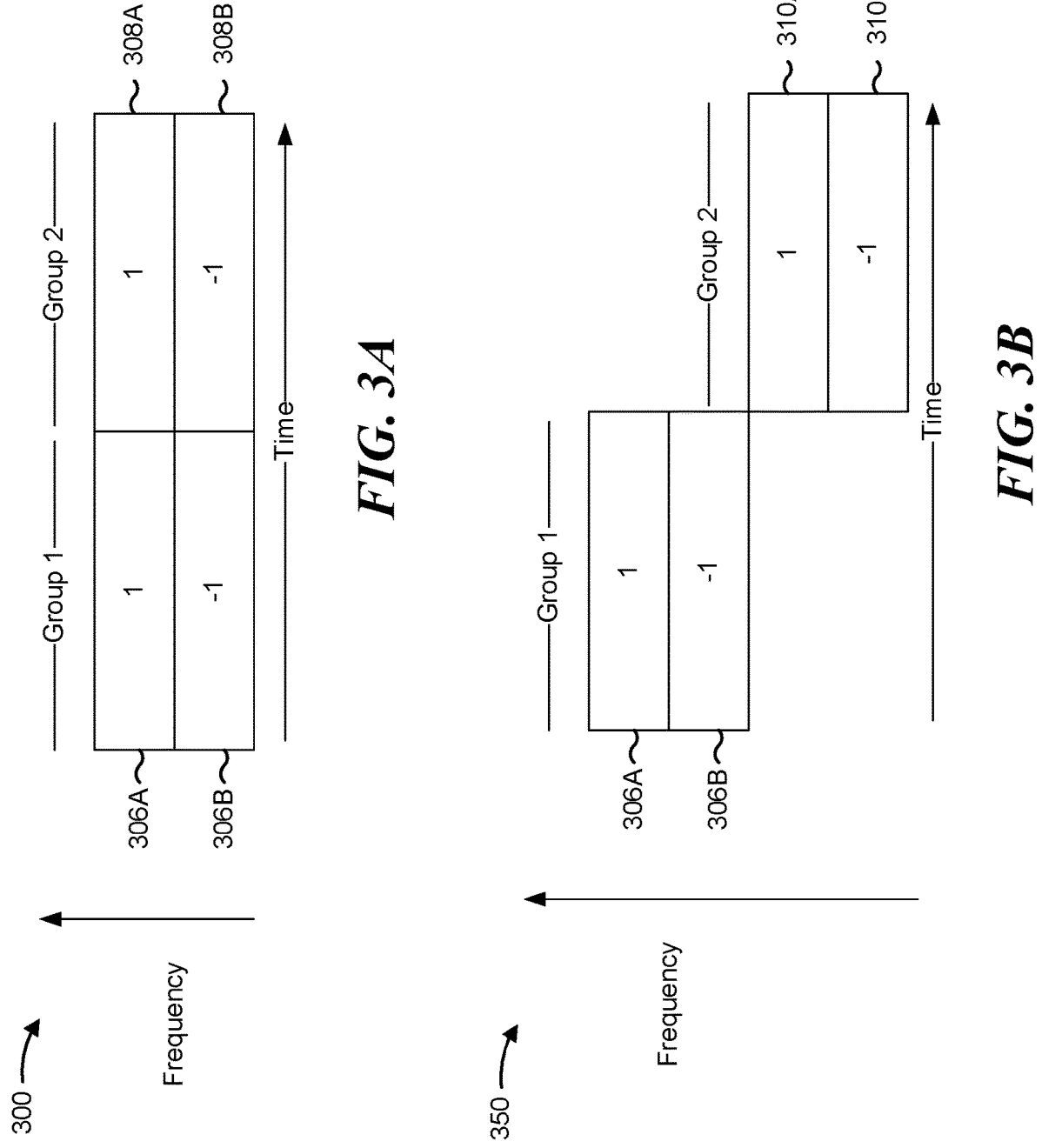
FIGS. 3A and 3B are block diagrams illustrating examples of two groups of resource elements, in accordance with aspects of the present disclosure.

In some examples, two or more groups of resource elements may have the same data. FIG. 3A is a diagram illustrating an example 300 of two groups (shown as Group 1 and Group 2) of resource elements 306A, 306B, 308A, and 308B, in accordance with aspects of the present disclosure. In the example 300 of FIG. 3A, each group of resource elements 306A, 306B, 308A, and 308B may be jointly encoded. As an example, a first group (Group 1) of resource elements 306A and 306B may be jointly encoded as (1, −1) and a second group (Group 2) of resource elements 308A and 308B may be jointly encoded as (1, −1). In some examples, for each group, a data-aware precoder function may have a same output because both groups have the same data. In other examples, a different data decoder function $f_2($ ) may be specified for each group to distinguish the data of each group, thereby improving data and allocation awareness. In such examples, a UE and base station may agree on a data decoder function $f_2($ ). As an example, the data decoder function $f_2($ ) may be a function of one or both of time or frequency resources. In the example 300 of FIG. 3A, first resource elements 306A and 308A and second resource elements 306B and 308B of each respective group have the same frequency resource. In such examples, a data precoder function $f_2($ ) of each respective group may be a function of a time resource (for example, symbol index) of the corresponding respective group.

In some other examples, two or more groups may use different frequency resources. FIG. 3B is a diagram illustrating an example 350 of two groups (shown as Group 1 and Group 2) of resource elements 306A, 306B, 310A, and 310B, in accordance with aspects of the present disclosure. In the example 350 of FIG. 3B, first resource elements 306A and 310A and second resource elements 306B and 310B of each respective group use different frequency resources. In such examples, a data precoder function $f_2($ ) of each respective group may be a function of a time resource and frequency resources of the corresponding respective group.

In some other examples, a precoder may be precode all resource elements across all subcarriers X (for example, tones), where X=M*(number of data layer symbols), and M represents a number of resource elements used for a data transmission. In such examples, a same data precoding function may be specified for the subcarriers X of an entire transmitted symbol vector. Additionally, in such examples, a receiver may jointly decode the subcarriers. In some implementations, the wideband precoding function may be, $f(H_1, H_2, H_3, \ldots, H_X, s_1, s_2, \ldots, s_X)$ or $p_{k1}p_{k2}=f_1(H_1, H_2, \ldots, H_X)f_2(s_1, s_2, \ldots, s_X)$. In such implementations, a single data-aware precoder may be specified for the entire transmitted symbol vector. In one example, based on the example 300 of FIG. 3A, the wideband precoding function may precode all resource elements 306A, 306B, 308A, and 308B. In such an example, the data precoding function may be $f(1, −1, 1, −1)$. The wideband precoding may not be limited to joint precoding. In some examples, separate precoding functions (for example, $f_1(H_1, H_2, \ldots, H_X)f_2(s_1, s_2, \ldots, s_X)$) may be used for the wideband precoding.

Figure 4:
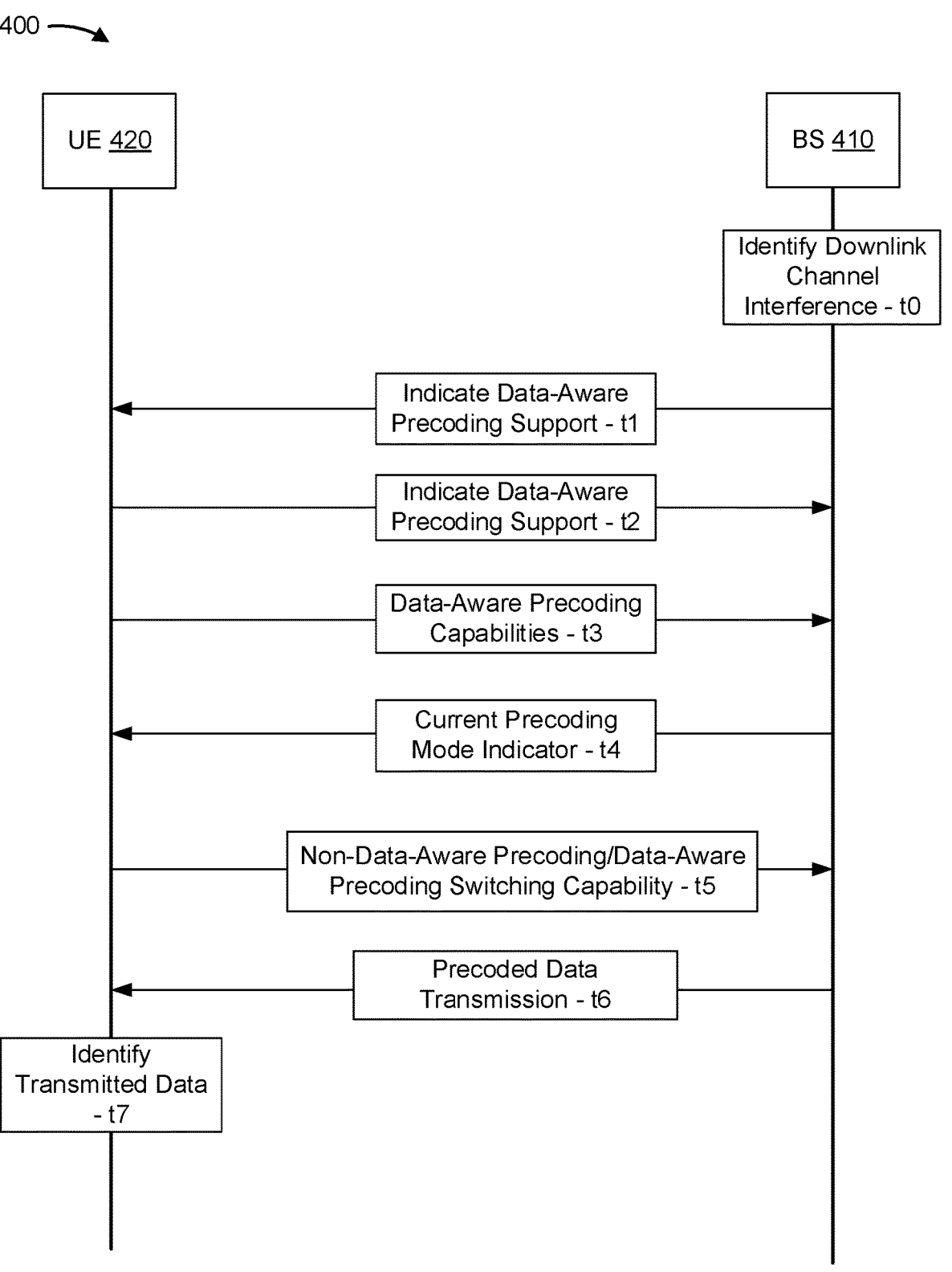
FIG. 4 is a timing diagram illustrating an example of a data-aware precoding process, in accordance with aspects of the present disclosure.

FIG. 4 is a timing diagram illustrating an example 400 of a data-aware precoding process, in accordance with aspects of the present disclosure. In the example 400 of FIG. 4, a UE 420 may be one of multiple UEs served by a base station 410. The UE 420 and the base station 410 may be examples of a UE 120 and a base station 110, respectively, as discussed with reference to FIGS. 1 and 2. As shown in FIG. 4, at time t0, the base station 410 identifies downlink channel interference. In some examples, the downlink channel interference may be determined from a channel state report, such as a CSI report, or another interference measurement process. Additionally, at time t1, the UE 420 receives, from the base station 410, a first message indicating the base station 410 supports data-aware precoding. Furthermore, at time t2, the UE 420 transmits a second message indicating the UE 420 supports the data-aware precoding. In some examples, the second message may be transmitted based on the received first message. At time t3, the UE 420 may also transmit a third message indicating the UE's data-aware precoding capabilities. In some examples, the indication of the UE's data-aware precoding capabilities may be included in the second message transmitted at time t2. The UE's data-aware precoding capabilities may include a number of resource elements supported for group precoding or an indication of whether the UE 420 supports wideband precoding.

Additionally, in the example 400 of FIG. 4, at time t4, the UE 420 receives a current precoding mode indicator identifying a current precoding mode of the base station 410. In some examples, the precoding mode indicator is received in downlink control information (DCI), radio resource control (RRC) signaling, or a medium access control (MAC) control element (CE). In some implementations, the current precoding mode includes a separate precoding mode (for example, $f_1(H_k)f_2(s_k)$ or $f_1(H_1, H_2, \ldots, H_M)f_2(s_1, s_2, \ldots, s_M)$) or a joint precoding mode (for example, $f(H_k, s_k)$ or $f(H_1, H_2, H_3, \ldots, H_M, s_1, s_2, \ldots, s_M)$). In such implementations, one or more resource elements of one or more subcarriers (for example, tones) may be precoded based on the current precoding mode. In some examples, a single resource element of a symbol may be precoded based on the current precoding mode. In some other examples, multiple resource elements of multiple subcarriers across one or more symbols may be precoded based on the current precoding mode. Additionally, the transmission at time t4 may indicate a data precoder function, such as $f_2(\ )$. In some implementations, the current precoding mode indicator may also indicate whether group precoding or wideband precoding are used for precoding the data transmission and the data channel. In some such implementations, the base station 410 may use group precoding or wideband precoding based on the UE 420 indicating support for the group precoding or the wideband precoding.

In some examples, the UE 420 may not simultaneously support non-data-aware precoding and data-aware precoding. Therefore, the base station 410 may request the UE 420 to switch from one precoding process, such as non-data-aware precoding, to another precoding process, such as data-aware precoding. In such examples, as shown in FIG. 4, at time t5, the UE 420 transmits a fourth message indicating the UE's capability to switch from the non-data-aware precoding to the data-aware precoding, or vice versa. Additionally, as shown in FIG. 4, at time t6, the UE 420 receives a data transmission on a data channel. In some implementations, both the data transmission and the data channel, such as a PDSCH, may be precoded (for example, $f_1(H_k)f_2(s_k)$ or $f_1(H_1, H_2, \ldots, H_M)f_2(s_1, s_2, \ldots, s_M)$) based on the current precoding mode. In such implementations, the data transmission and the data channel may be precoded based on the determined interference, such that the determined interference increases a signal strength of the data transmission on the data channel. Finally, at time t7, the UE 420 may identify the transmitted data on the data channel. In such implementations, the data channel may be decoded based on the channel precoder function determined based on the DMRS and the data may be decoded based on the data precoder function identified based on the explicit indication.

FIG. 5 is a block diagram of a wireless communication device 500 that supports data-aware precoding, in accordance with various aspects of the present disclosure. The wireless communication device 500 may be an example of aspects of a UE 120 and 420, or its components, as described with reference to FIGS. 1, 2, and 4, respectively. The wireless communication device 500 may include a receiver 510, a communications manager 515, and a transmitter 520, which may be in communication with one another (for example, via one or more buses). In some examples, the wireless communication device 500 is configured to perform operations including operations of the process 600 described below with reference to FIG. 6.

In some examples, the wireless communication device 500 can include a chip, system-on-a-chip (SoC), chipset, package, or device that includes at least one processor and at least one modem (for example, a 5G modem or other cellular modem). In some examples, the communications manager 515, or its sub-components, may be separate and distinct components. In some examples, at least some components of the communications manager 515 are implemented at least in part as software stored in a memory. For example, portions of one or more of the components of the communications manager 515 can be implemented as non-transitory code executable by the processor to perform the functions or operations of the respective component.

The receiver 510 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a base station 120 and 420, or its components, as described with reference to FIGS. 1, 2, and 4, respectively.

The received information may be passed on to other components of the device 500. The receiver 510 may be an example of aspects of the receive processor 238 described with reference to FIG. 2. The receiver 510 may include a set of radio frequency (RF) chains that are coupled with or otherwise utilize a set of antennas (for example, the set of antennas may be an example of aspects of the antennas 234a through 234t described with reference to FIG. 2).

The transmitter 520 may transmit signals generated by the communications manager 515 or other components of the wireless communication device 500. The transmitter 520 may be an example of aspects of the transmit processor 220 described with reference to FIG. 2. The transmitter 520 may be coupled with or otherwise utilize a set of antennas (for example, the set of antennas may be an example of aspects of the antennas 234a through 234t described with reference to FIG. 2), which may be antenna elements shared with the receiver 510. In some examples, the transmitter 520 is configured to transmit random access procedure messages in a PRACH or PUSCH.

The communications manager 515 may be an example of aspects of the controller/processor 280 described with reference to FIG. 2. The communications manager 515 includes a data-aware precoding capability component 530 and a data decoding component 540. In some examples, working in conjunction with the receiver 510, the data-aware precoding capability component 530 may receive, from a transmitting device, an indication that the transmitting device supports data-aware precoding. Additionally, working in conjunction with the transmitter 520, the data-aware precoding capability component 530 may transmit, to the transmitting device based on the an indication that, an indication that the UE supports the data-aware precoding and an indication of data-aware precoding capabilities of the device 500. In some examples, working in conjunction with the receiver 510, the data-aware precoding capability component 530 may receive, from the transmitting device, a current precoding mode indicator identifying a current precoding mode for precoding one or more resource elements of one or more subcarriers at the base station. Furthermore, working in conjunction with the receiver 510, the data decoding component 540 may receiving, from the transmitting device, a data transmission on a data channel, both the data transmission and the data channel precoded based on the current precoding mode, and also decode the data transmission and the data channel based on the current precoding mode.

FIG. 6 is a flow diagram illustrating an example process 600 performed, for example, by a UE, in accordance with various aspects of the present disclosure. The example process 600 is an example of receiving and decoding data-aware precoded data on a data-aware precoded channel. In some implementations, the process 600 may be performed by a wireless communication device operating as or within a UE, such as one of the UE 120 and 420, or its components, as described with reference to FIGS. 1, 2, and 4.

In some implementations, the process 600 begins in block 602 by receiving, from a base station, an indication that the base station supports data-aware precoding. At block 604, the process 600 transmits, to the base station based on the base station supporting data-aware precoding, an indication that the UE supports the data-aware precoding and an indication of data-aware precoding capabilities of the UE. Furthermore, at block 606, the process 600 receives, from the base station, a current precoding mode indicator identifying a current precoding mode for precoding one or more resource elements of one or more subcarriers at the base station. At block 608, the process 600 proceeds with receiving, from the base station, a data transmission on a data channel, both the data transmission and the data channel precoded based on the current precoding mode. Finally, at block 610, the process 600 decodes the data transmission and the data channel based on the current precoding mode.

FIG. 7 is a block diagram of a wireless communication device 700 that supports data-aware precoding, in accordance with various aspects of the present disclosure. The wireless communication device 700 may be an example of aspects of a base station 110 and 410, or its components, as described with reference to FIGS. 1, 2, and 4, respectively. The wireless communication device 700 may include a receiver 710, a communications manager 715, and a transmitter 720, which may be in communication with one another (for example, via one or more buses). In some examples, the wireless communication device 700 is configured to perform operations including operations of the process 800 described below with reference to FIG. 8.

In some examples, the wireless communication device 700 can include a chip, system-on-a-chip (SoC), chipset, package, or device that includes at least one processor and at least one modem (for example, a 5G modem or other cellular modem). In some examples, the communications manager 715, or its sub-components, may be separate and distinct components. In some examples, at least some components of the communications manager 715 are implemented at least in part as software stored in a memory. For example, portions of one or more of the components of the communications manager 715 can be implemented as non-transitory code executable by the processor to perform the functions or operations of the respective component.

The receiver 710 may receive one or more of reference signals (for example, periodically configured CSI-RSs, aperiodically configured CSI-RSs, or multi-beam-specific reference signals), synchronization signals (for example, SSBs), control information and data information, such as in the form of packets, from one or more other wireless communication devices via various channels including control channels (for example, a physical downlink control channel (PDCCH)) and data channels (for example, a physical downlink shared channel (PDSCH)). The other wireless communication devices may include, but are not limited to, a UE 110 and 410, or its components, as described with reference to FIGS. 1, 2, and 4, respectively.

The received information may be passed on to other components of the device 700. The receiver 710 may be an example of aspects of the receive processor 238 described with reference to FIG. 2. The receiver 710 may include a set of radio frequency (RF) chains that are coupled with or otherwise utilize a set of antennas (for example, the set of antennas may be an example of aspects of the antennas 234a through 234t described with reference to FIG. 2).

The transmitter 720 may transmit signals generated by the communications manager 715 or other components of the wireless communication device 700. The transmitter 720 may be an example of aspects of the transmit processor 220 described with reference to FIG. 2. The transmitter 720 may be coupled with or otherwise utilize a set of antennas (for example, the set of antennas may be an example of aspects of the antennas 234a through 234t described with reference to FIG. 2), which may be antenna elements shared with the receiver 710. In some examples, the transmitter 720 is configured to transmit random access procedure messages in a PRACH or PUSCH.

The communications manager 715 may be an example of aspects of the controller/processor 240 described with reference to FIG. 2. The communications manager 715 includes a data-aware precoding capability component 730 and a data-aware precoding component 740. In some implementations, working in conjunction with the transmitter 720, the data-aware precoding capability component 730 transmits, to a UE, an indication that the base station supports data-aware precoding. In some examples, working in conjunction with the receiver 710, the data-aware precoding capability component 730 also receives, from the UE based on the base station supporting data-aware precoding, an indication that the UE supports the data-aware precoding and an indication of data-aware precoding capabilities of the UE. Additionally, working in conjunction with the transmitter 720, the data-aware precoding capability component 730 may also transmit, to the UE, a current precoding mode indicator identifying a current precoding mode for precoding one or more resource elements of one or more subcarriers at the base station. The method further includes precoding data and a data channel based on the current precoding mode. The method still further includes transmitting, to the UE, the precoded data on the precoded data channel.

FIG. 8 is a flow diagram illustrating an example process 800 performed, for example, by a base station, in accordance with various aspects of the present disclosure. The example process 800 is an example of a data-aware precoding process. In some implementations, the process 800 may be performed by a wireless communication device operating as or within a base station, such as one of the base station 110 and 410, or its components, as described with reference to FIGS. 1, 2, and 4.

In some implementations, the process 800 begins in block 802 by transmitting, to a UE, an indication that the base station supports data-aware precoding. At block 804, the process 800 receives, from the UE based on the base station supporting data-aware precoding an indication that the UE supports the data-aware precoding and an indication of data-aware precoding capabilities of the UE. Furthermore, at block 806, the process 800 transmits, to the UE, a current precoding mode indicator identifying a current precoding mode for precoding one or more resource elements of one or more subcarriers at the base station. At block 808, the process 800 precodes data and a data channel based on the current precoding mode. Finally, at block 810, the process 800 transmits, to the UE, the precoded data on the precoded data channel.

The following provides an overview of some Aspects of the present disclosure:

Aspect 1: A method for wireless communication performed at a user equipment (UE), the method comprising: receiving, from a base station, a first message indicating the base station supports data-aware precoding; transmitting, to the base station based on the base station supporting data-aware precoding, an indication that the UE supports the data-aware precoding and an indication of data-aware precoding capabilities of the UE; receiving, from the base station, a current precoding mode indicator identifying a current precoding mode for precoding one or more resource elements of one or more subcarriers at the base station; receiving, from the base station, a data transmission on a data channel, both the data transmission and the data channel precoded based on the current precoding mode; and decoding the data transmission and the data channel based on the current precoding mode.

Aspect 2: The method of Aspect 1, further comprising: transmitting, to the base station, an indication of whether the UE supports switching between non-data-aware precoding and the data-aware precoding; receiving, from the base station, a request to switch from the non-data-aware precoding to the data-aware precoding based on the UE supporting the switching; and switching, at the UE, from the non-data-aware precoding to the data-aware precoding based on the request.

Aspect 3: The method of any of Aspects 1 to 2, wherein the data-aware precoding capabilities comprise an indication of a number of resource elements supported for group precoding or an indication of whether the UE supports wideband precoding.

Aspect 4: The method of any of Aspects 1 to 3, wherein the precoding mode indicator is received in downlink control information (DCI), radio resource control (RRC) signaling, or a medium access control (MAC) control element (CE).

Aspect 5: The method of any of Aspects 1 to 4, wherein the current precoding mode comprises a joint precoding mode associated with precoding the data transmission and the data channel based on a joint precoding function of the base station.

Aspect 6: The method of Aspect 5, wherein the joint precoding function precodes each data resource element of an entire symbol vector.

Aspect 7: The method of any of Aspects 1 to 4, wherein the current precoding mode comprises a separate precoding mode associated with precoding the data transmission based on a data precoder function of the base station and precoding the data channel based on a channel precoder function of the base station.

Aspect 8: The method of Aspect 7, further comprising: determining the data precoder function based on an explicit indication; and determining the channel precoder function based on a demodulation reference signal (DMRS).

Aspect 9: The method of Aspect 8, wherein the data precoder function is based on one or both of frequency indices or time indices of a plurality of resource elements of a symbol precoded based on the current precoding mode.

Aspect 10: The method of any of Aspects 1 to 9, wherein the current precoding mode indicator further indicates that the current precoding mode is associated with group precoding or wideband precoding based on the data-aware precoding capabilities of the UE.

Aspect 11: A method for wireless communication performed by a base station, comprising: transmitting, to a user equipment (UE), a first message indicating the base station supports data-aware precoding; receiving, from the UE based on the first message, a second message indicating the UE supports the data-aware precoding; receiving, from the UE based on the transmitted second message, a third message indicating data-aware precoding capabilities of the UE; transmitting, to the UE, a current precoding mode indicator identifying a current precoding mode for precoding one or more resource elements of one or more subcarriers of the base station; precoding data and a data channel based on the current precoding mode; and transmitting, to the UE, the precoded data on the precoded data channel.

Aspect 12: The method of Aspect 11, further comprising: receiving, from the UE, an indication of whether the UE supports switching from non-data-aware precoding to the data-aware precoding; and transmitting, to the UE, a request to switch from the non-data-aware precoding to the data-aware precoding based on the UE supporting the switch from the non-data-aware precoding to the data-aware precoding.

Aspect 13: The method of any of Aspects 11 to 12, wherein the data-aware precoding capabilities comprise an indication of a number of resource elements supported for group precoding or an indication of whether the UE supports wideband precoding.

Aspect 14: The method of any of Aspects 11 to 13, wherein the precoding mode indicator is received in downlink control information (DCI), radio resource control (RRC) signaling, or a medium access control (MAC) control element (CE).

Aspect 15: The method of any of Aspects 11 to 14, wherein the current precoding mode comprises a joint precoding mode associated with precoding the data transmission and the data channel based on a joint precoding function of the base station.

Aspect 16: The method of Aspect 15, wherein the joint precoding function precodes each data resource element of an entire symbol vector.

Aspect 17: The method of any of Aspects 11 to 14, wherein the current precoding mode comprises a separate precoding mode associated with precoding the data transmission based on a data precoder function of the base station and precoding the data channel based on a channel precoder function of the base station.

Aspect 18: The method of Aspect 17, further comprising: transmitting an explicit indication to identify the data precoder function; and transmitting a demodulation reference signal (DMRS) precoded based on the channel precoder function.

Aspect 19: The method of Aspect 18, wherein the data precoder function is based on one or both of frequency indices or time indices of a plurality of resource elements of a symbol precoded based on the current precoding mode.

Aspect 20: The method of any of Aspects 11 to 19, wherein the current precoding mode indicator further indicates that the current precoding mode is associated with group precoding or wideband precoding based on the data-aware precoding capabilities of the UE.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communications at a user equipment (UE), comprising:
   one or more processor components;
   one or more memory components that store instructions that, when executed by the one or more processor components, are configured to cause the apparatus to:
      wirelessly receive, from a base station, an indication that the base station supports data-aware precoding;
      wirelessly transmit, to the base station based on the base station supporting data-aware precoding, an indication that the UE supports the data-aware precoding and an indication of one or more data-aware precoding capabilities of the UE, wherein the indication of the one or more data-aware precoding capabilities comprises an indication of a number of resource elements supported for data-aware group precoding or an indication of whether the UE supports data-aware wideband precoding;
      wirelessly receive, from the base station, and in accordance with the one or more data-aware precoding capabilities, an indication of a data-aware precoding mode for data-aware precoding at the base station, wherein the indication of the data-aware precoding mode further indicates whether the data-aware precoding is in accordance with group precoding or wideband precoding in accordance with the one or more data-aware precoding capabilities of the UE;
      wirelessly receive, from the base station, data via a data channel precoded in accordance with the data-aware precoding mode; and
      decode the data in accordance with the data-aware precoding mode.

2. The apparatus of claim 1, wherein execution of the instructions further cause the apparatus to:
   transmit, to the base station, an indication of whether the UE supports switching between non-data-aware precoding and the data-aware precoding;
   receive, from the base station, a request to switch from the non-data-aware precoding to the data-aware precoding based on the UE supporting the switching; and
   switch, at the UE, from the non-data-aware precoding to the data-aware precoding based on the request.

3. The apparatus of claim 1, wherein the indication of the data-aware precoding mode is received in downlink control information (DCI), radio resource control (RRC) signaling, or a medium access control (MAC) control element (CE).

4. An apparatus for wireless communications at a user equipment (UE), comprising:
   one or more processor components;
   one or more memory components that store instructions that, when executed by the one or more processor components, are configured to cause the apparatus to:
      wirelessly receive, from a base station, an indication that the base station supports data-aware precoding;
      wirelessly transmit, to the base station based on the base station supporting data-aware precoding, an indication that the UE supports the data-aware precoding and an indication of one or more data-aware precoding capabilities of the UE, wherein the indication of the one or more data-aware precoding capabilities comprises an indication of a number of resource elements supported for data-aware group precoding or an indication of whether the UE supports data-aware wideband precoding;
      wirelessly receive, from the base station, and in accordance with the one or more data-aware precoding capabilities, an indication of a data-aware precoding mode for data-aware precoding at the base station, wherein the data-aware precoding mode is:
         a joint precoding mode associated with precoding data and a data channel in accordance with a joint precoding function of the base station, or
         a separate precoding mode associated with precoding the data in accordance with a data precoder function of the base station and precoding the data channel in accordance with a channel precoder function of the base station;
      wirelessly receive, from the base station, the data via the data channel precoded in accordance with the data-aware precoding mode; and
      decode the data in accordance with the data-aware precoding mode.

5. The apparatus of claim 4, wherein the joint precoding function precodes each data resource element of an entire symbol vector.

6. The apparatus of claim 4, wherein execution of the instructions further cause the apparatus to:

determine the data precoder function based on an explicit indication; and determine the channel precoder function based on a demodulation reference signal (DMRS).

7. The apparatus of claim 6, wherein the data precoder function is based on one or both of frequency indices or time indices of a plurality of resource elements of a symbol precoded based on the current precoding mode.

8. A method for wireless communication performed at a user equipment (UE), the method comprising:

wirelessly receiving, from a base station, an indication that the base station supports data-aware precoding;

wirelessly transmitting, to the base station based on the base station supporting data-aware precoding, an indication that the UE supports the data-aware precoding and an indication of one or more data-aware precoding capabilities of the UE, wherein the indication of the one or more data-aware precoding capabilities comprises an indication of a number of resource elements supported for data-aware group precoding or an indication of whether the UE supports data-aware wideband precoding;

wirelessly receiving, from the base station, and in accordance with the one or more data-aware precoding capabilities, an indication of a data-aware precoding mode for data-aware precoding at the base station, wherein the indication of the data-aware precoding mode further indicates whether the data-aware precoding is in accordance with group precoding or wideband precoding in accordance with the one or more data-aware precoding capabilities of the UE;

wirelessly receiving, from the base station, data via a data channel precoded in accordance with the data-aware precoding mode; and decoding the data in accordance with the data-aware precoding mode.

9. The method of claim 8, further comprising:

transmitting, to the base station, an indication of whether the UE supports switching between non-data-aware precoding and the data-aware precoding;

receiving, from the base station, a request to switch from the non-data-aware precoding to the data-aware precoding based on the UE supporting the switching; and switching, at the UE, from the non-data-aware precoding to the data-aware precoding based on the request.

10. A method for wireless communication performed at a user equipment (UE), the method comprising:

wirelessly receiving, from a base station, an indication that the base station supports data-aware precoding;

wirelessly transmitting, to the base station based on the base station supporting data-aware precoding, an indication that the UE supports the data-aware precoding and an indication of one or more data-aware precoding capabilities of the UE, wherein the indication of the one or more data-aware precoding capabilities comprises an indication of a number of resource elements supported for data-aware group precoding or an indication of whether the UE supports data-aware wideband precoding;

wirelessly receiving, from the base station, and in accordance with the one or more data-aware precoding capabilities, an indication of a data-aware precoding mode for data-aware precoding at the base station, wherein the data-aware precoding mode is:

a joint precoding mode associated with precoding data transmission and a data channel based on in accordance with a joint precoding function of the base station, or a separate precoding mode associated with precoding the data in accordance with a data precoder function of the base station and precoding the data channel in accordance with a channel precoder function of the base station;

wirelessly receiving, from the base station, the data via the data channel precoded in accordance with the data-aware precoding mode; and decoding the data in accordance with the data-aware precoding mode.

11. The method of claim 10, further comprising:

determining the data precoder function based on an explicit indication; and determining the channel precoder function based on a demodulation reference signal (DMRS).

12. An apparatus for wireless communications at a base station, comprising:

one or more processor components;

one or more memory components that store instructions that, when executed by the one or more processor components, are configured to cause the apparatus to:

wirelessly transmit, to a user equipment (UE), an indication that the base station supports data-aware precoding;

wirelessly receive, from the UE based on the base station supporting data-aware precoding, an indication that the UE supports the data-aware precoding and an indication of one or more data-aware precoding capabilities of the UE, wherein the indication of the one or more data-aware precoding capabilities comprises an indication of a number of resource elements supported for data-aware group precoding or an indication of whether the UE supports data-aware wideband precoding;

wirelessly transmit, to the UE, and in accordance with the one or more data-aware precoding capabilities, an indication of a data-aware precoding mode for current data-aware precoding at the base station, wherein the indication of the data-aware precoding mode further indicates whether the data-aware precoding is associated with group precoding or wideband precoding in accordance with the one or more data-aware precoding capabilities of the UE;

precode data and a data channel in accordance with the data-aware precoding mode; and wirelessly transmit, to the UE, the precoded data via the precoded data channel.

13. The apparatus of claim 12, wherein execution of the instructions further cause the apparatus to:

receive, from the UE, an indication of whether the UE supports switching between non-data-aware precoding and the data-aware precoding; and transmit, to the UE, a request to switch from the non-data-aware precoding to the data-aware precoding based on the UE supporting the switching.

14. The apparatus of claim 12, wherein the precoding mode indicator is received in downlink control information (DCI), radio resource control (RRC) signaling, or a medium access control (MAC) control element (CE).

15. An apparatus for wireless communications at a base station, comprising:

one or more processor components;

one or more memory components that store instructions that, when executed by the one or more processor components, are configured to cause the apparatus to:

wirelessly transmit, to a user equipment (UE), an indication that the base station supports data-aware precoding;

wirelessly receive, from the UE based on the base station supporting data-aware precoding, an indication that the UE supports the data-aware precoding and an indication of one or more data-aware precoding capabilities of the UE, wherein the indication of the one or more data-aware precoding capabilities comprises an indication of a number of resource elements supported for data-aware group precoding or an indication of whether the UE supports data-aware wideband precoding;

wirelessly transmit, to the UE, and in accordance with the one or more data-aware precoding capabilities, an indication of a data-aware precoding mode for data-aware precoding at the base station, wherein the data-aware precoding mode is:

a joint precoding mode associated with precoding data and a data channel in accordance with a joint precoding function of the base station, or a separate precoding mode associated with precoding the data in accordance with a data precoder function of the base station and precoding the data channel in accordance with a channel precoder function of the base station;

precode the data and the data channel in accordance with the data-aware precoding mode; and wirelessly transmit, to the UE, the precoded data via the precoded data channel.

16. The apparatus of claim 15, wherein the joint precoding function precodes each data resource element of an entire symbol vector.

17. The apparatus of claim 15, wherein execution of the instructions further cause the apparatus to:

transmit an explicit indication to identify the data precoder function; and transmit a demodulation reference signal (DMRS) precoded based on the channel precoder function.

18. The apparatus of claim 17, wherein the data precoder function is based on one or both of frequency indices or time indices of a plurality of resource elements of a symbol precoded based on the current precoding mode.

* * * * *